United States Patent Office 2,768,222
Patented Oct. 23, 1956

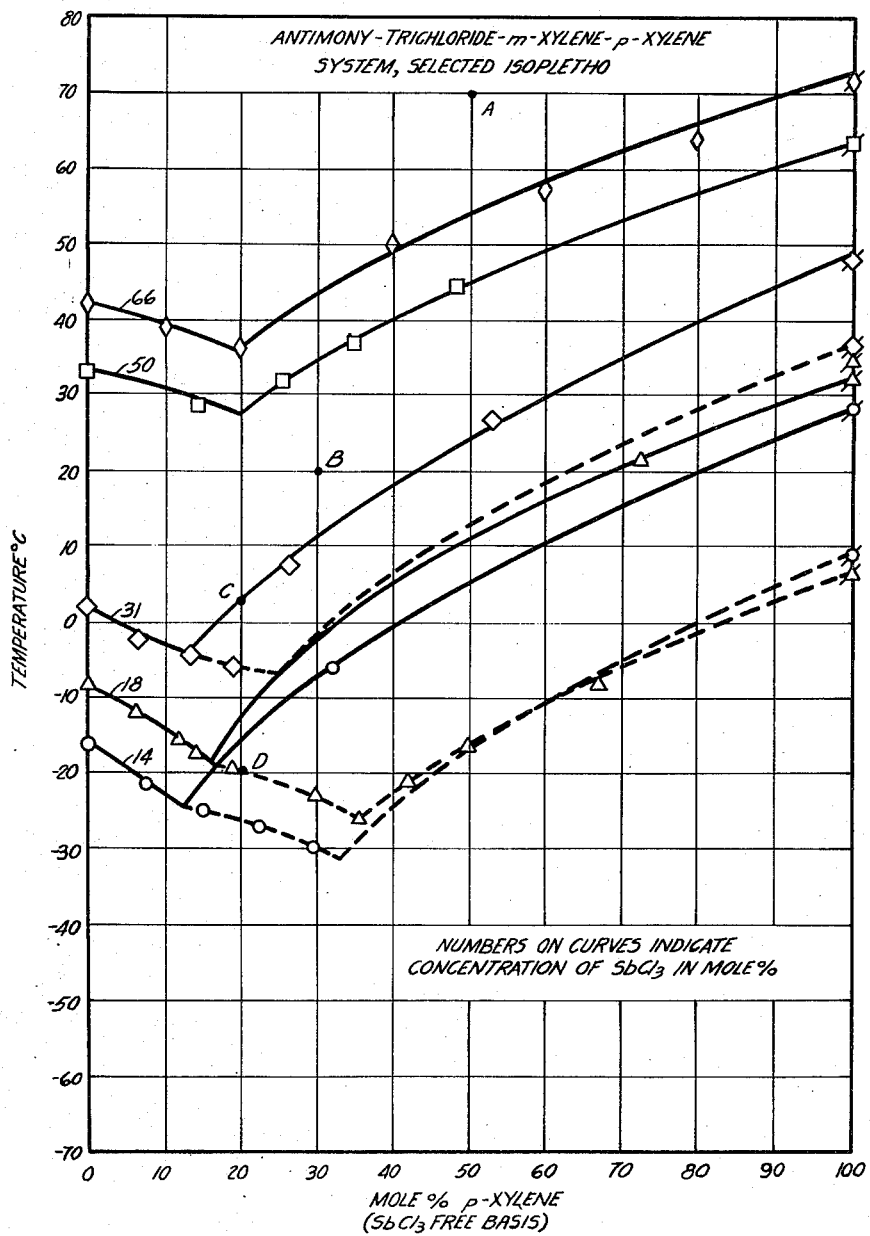
Fig. I
Inventors: Alan C. Nixon
Carl H. Deal Jr.

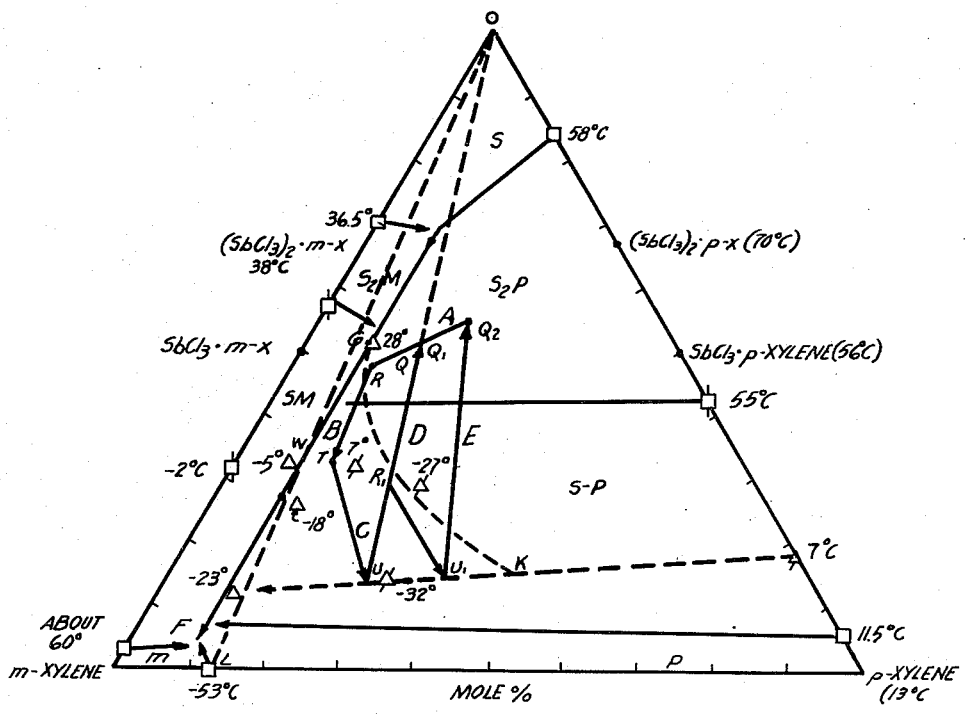
ANTIMONY-TRICHLORIDE-m-XYLENE-p-XYLENE SYSTEM
Fig. II
☐ BINARY EUTECTICS
⌷ INCONGRUENT MELTING POINT
△ STABLE MINIMA
▲ META STABLE MINIMA
—— EUTECTIC OR INCONGRUENT LINES
--- META STABLE EUTECTIC LINES
Inventors: Alan C. Nixon
Carl H. Deal Jr.
By Their Attorney: James Todorovic

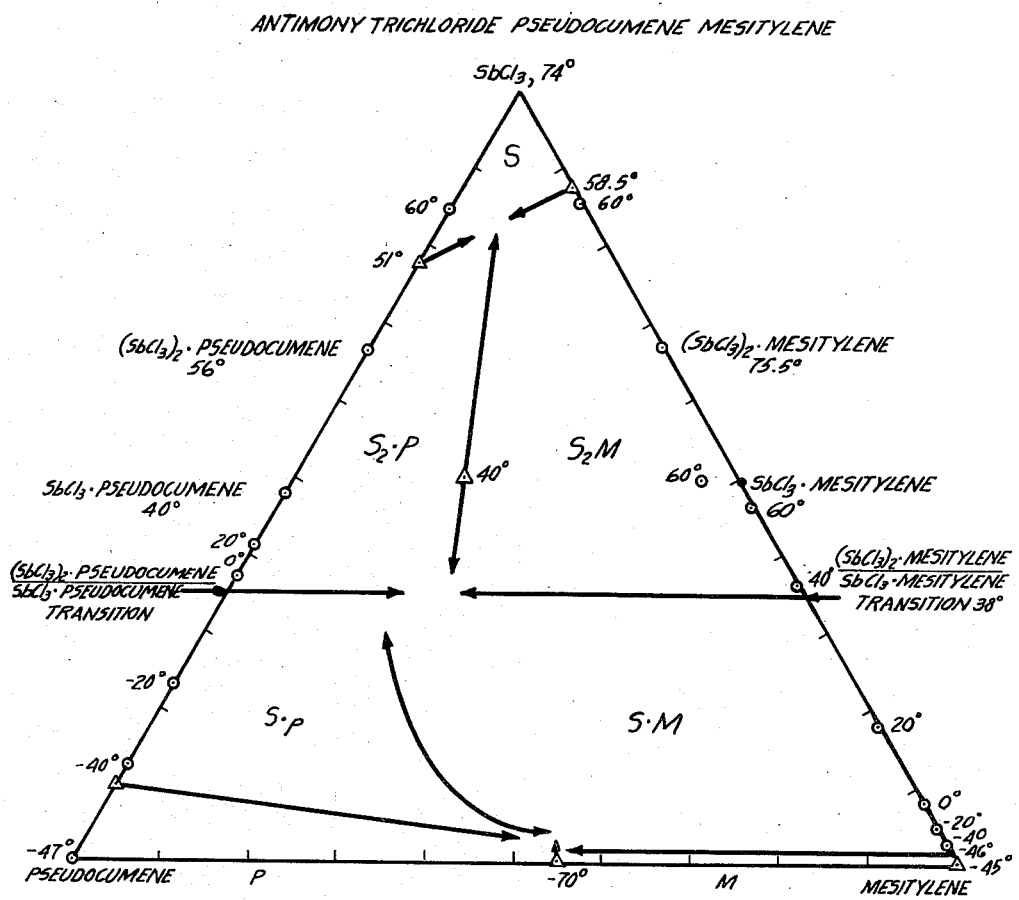
Fig. III

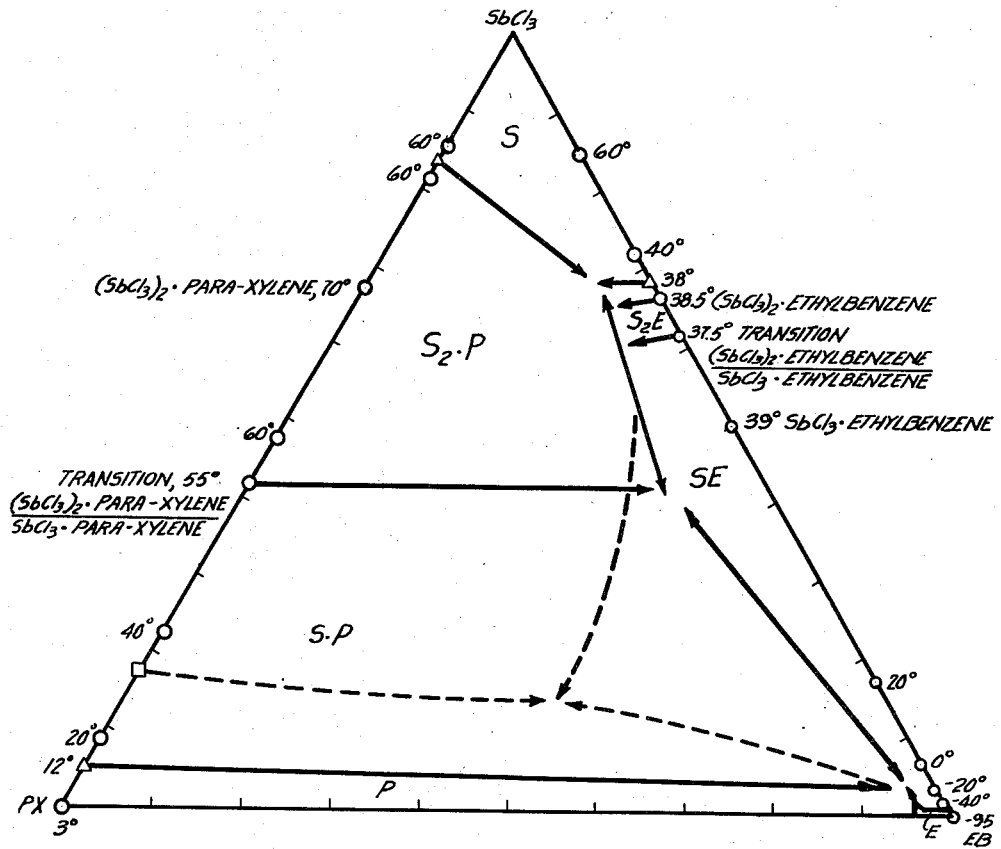
Fig. IV

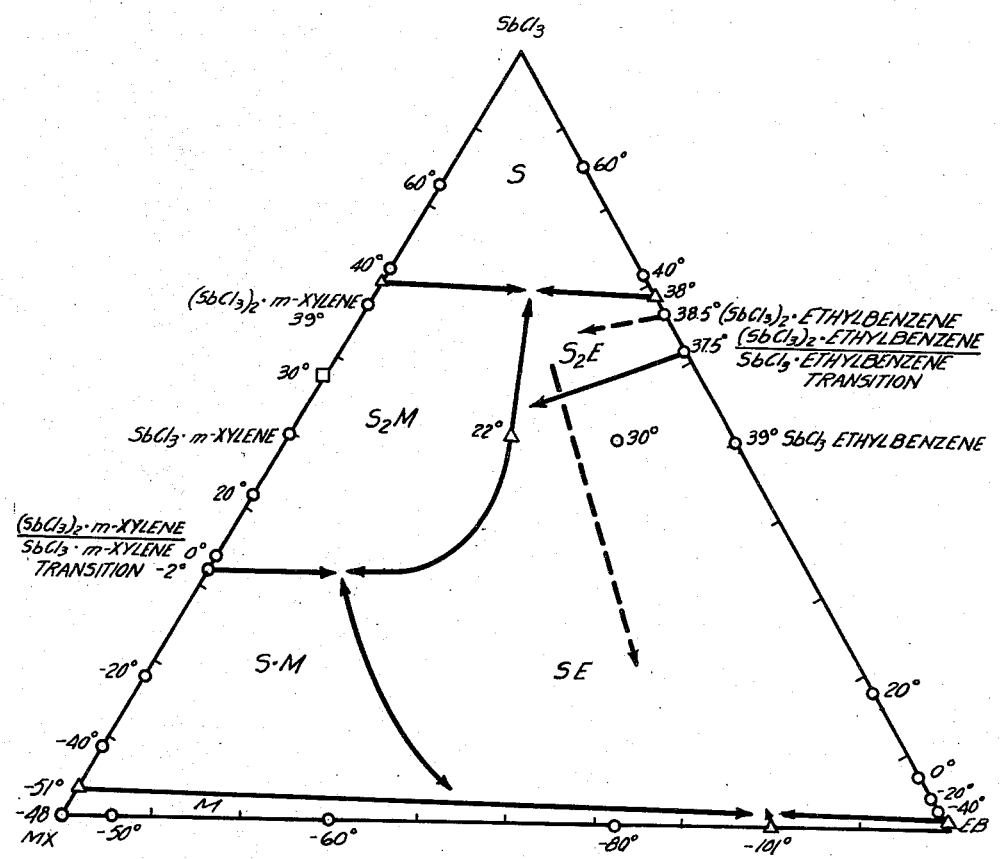

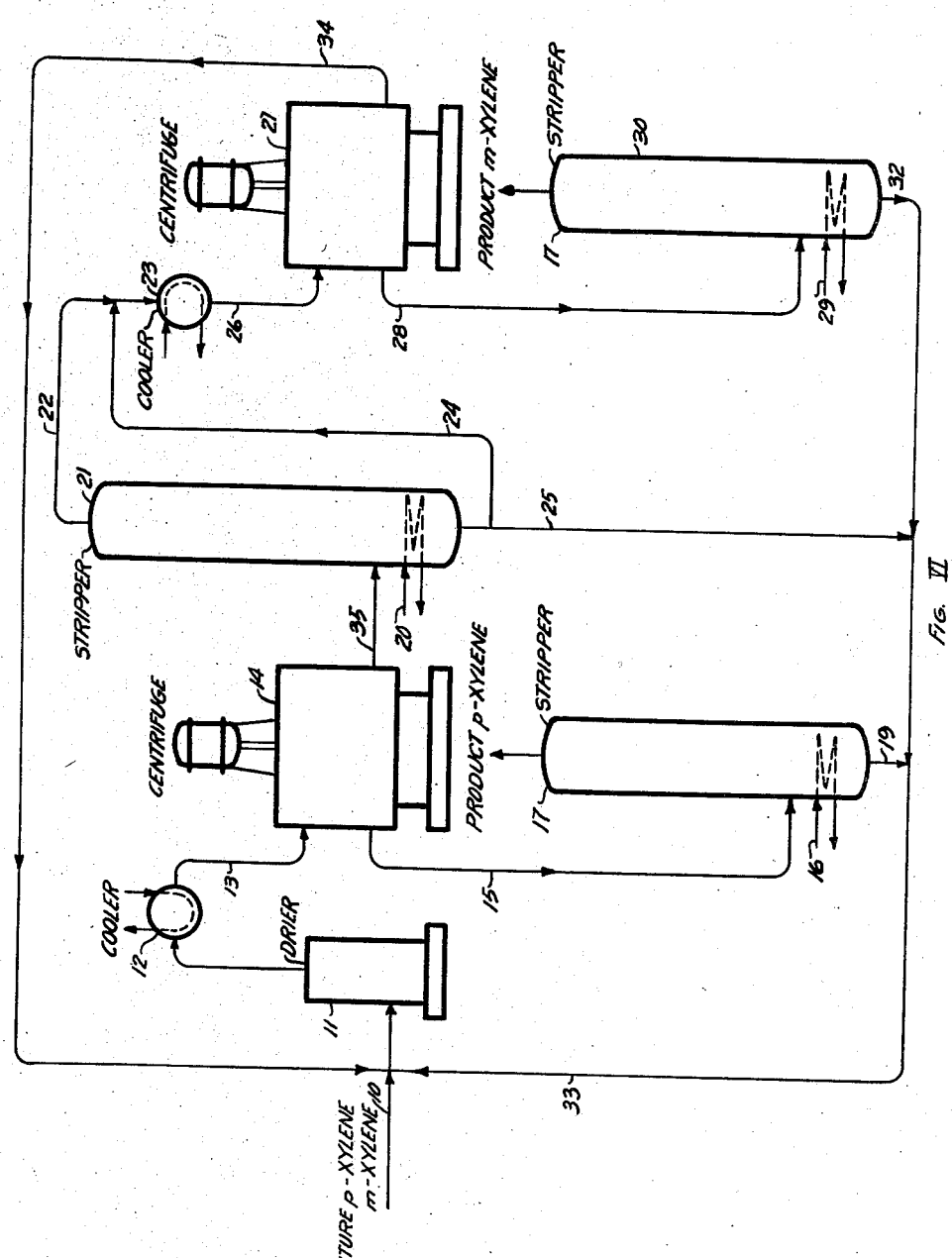

2,768,222

SEPARATION OF XYLENES WITH ANTIMONY TRICHLORIDE

Alan C. Nixon, Berkeley, and Carl H. Deal, Jr., Orinda, Calif., assignors to Shell Development Company, San Francisco, Calif., a corporation of Delaware Application March 31, 1950, Serial No. 153,251

8 Claims. (Cl. 260—674)

This invention relates to a method for the separation of mixtures of organic compounds and more particularly pertains to the separation of mixtures of hydrocarbons by crystallization. More specifically, the invention is concerned with the separation and purification of aromatic compounds from isomers thereof by a method involving selective crystallization of one of the aromatic compounds. In one aspect, the invention is concerned with the separation and purification by crystallization of a di-substituted benzene compound from admixtures with isomers thereof, such as the separation of metaxylene and para-xylene from a mixture thereof.

Mixtures of certain aromatic compounds, such as benzene, alkyl benzenes (toluene, xylenes, etc.) hydroxyl-benzenes (phenol, etc.) and hydroxy-alkyl-benzenes (cresols, xylenols, etc.) are produced as by-products from the coking of coal and also from certain petroleum conversion and separation processes. Mixtures of still other aromatic compounds, such as the nuclear-halogenated derivatives of benzene, toluene and the like are produced by suitable halogenation reactions of the corresponding aromatic compound as well as alkylation, for example, of halogenated benzene derivatives. Mixtures of isomeric nitro-aromatic compounds are obtained by nitration of aromatics, such as, mixtures of isomeric nitrotoluenes by the nitration of toluene; reduction of the nitro-groups yields mixtures of aromatic amines, such as the toluidines.

Various methods have been proposed for effecting at least partial separations as applied to mixtures as indicated above. Where there is a sufficient difference in the boiling points of some of the constituents of the given mixtures, the separation is effected by fractional distillations. Thus, ortho-xylene (B. P., 144.4° C. at atmospheric pressure) can be separated from a mixture containing it and the meta- and para-xylenes (boiling points, 139.3° C. and 138.5° C., respectively) by fractional distillation. However, the meta- and para-xylenes cannot be effectively separated from each other by such a method. A similar situation exists for other mixtures, such as a mixture of the ortho-, meta-, and para-cresols. In still other cases a separation of the ortho- from the meta- and para-isomers may be effected by distillation, even though the relative boiling points may be reversed, that is the boiling point of the ortho-isomer is lower than the boiling points of the meta- and para-isomers, such as is true in the case of the ortho-, meta- and para-chloro-hydroxy benzenes, the bromo-hydroxy-benzenes, the toluic acids and the dihydroxy-benzenes. But, in some cases the boiling points of all three isomers are too close together to permit effective separation by fractional distillation on a commercial scale, such as in the case of the isomeric methylchlorobenzenes, the isomeric methylbromobenzenes and the dibromobenzenes.

Separations by fractional crystallization have been utilized in some cases; but, in general eutectic mixtures are formed after only partial separation of one of the constituents, thus making it possible to obtain only one of the constituents in any substantial degree of purity while not obtaining any of them in a separated form in sufficiently high yields.

In still other cases, particularly in the case of highly polar substituted derivatives, such as the phenolic substances, separations have been effected by first subjecting the mixture to chemical conversion, such as sulfonation, alkylation, etc. followed by separation of the resulting mixture of new derivatives, and then reconversion of the separated substances such as by desulfonation, dealkylation, etc. to the original substances.

In general, however, the methods heretofore available have not been entirely satisfactory for the separation and recovery of isomeric aromatic compounds and other aromatic substances normally admixed therewith and having similar boiling points.

It is, therefore, a principal object of the present invention to provide an efficient and economic process for the separation of mixtures of organic compounds, particularly closely related compounds. A further object is to provide a method for the separation and recovery of one aromatic compound from a mixture thereof with a closely related aromatic compound. A still further object is the separation of a substituted aromatic hydrocarbon from a mixture thereof with a different similarly substituted aromatic hydrocarbon and which may form a eutectic with the first substance when the mixture is cooled sufficiently. Another object is concerned with the separation and recovery of para- and meta- xylenes from a mixture comprised substantially of para- and meta-xylenes. Still another object is to provide a method involving crystallization whereby both substantially pure para-xylene and substantially pure meta-xylene may be obtained from a mixture of the two alone or from commercial mixtures containing them and whereby good yields of both may be secured.

The above-mentioned objects of the invention and the method of attaining them as well as other objects will be more fully understood and will become apparent from the description of the invention as given hereinafter.

In accordance with the present invention, it has now been found that mixtures of related organic compounds may be separated into component parts thereof by admixing such mixtures with antimony trichloride and adjusting the temperature to fractionally crystallize from the resulting mixture a single molecular organic component thereof as a solid phase complex with antimony trichloride.

Described broadly, the invention is a process of separating substantially pure component substances from a mixture thereof by admixing said mixture with antimony trichloride and adjusting the temperature of the resulting mixture to solidify only one of the components substantially as a pure compound in the form of a solid phase complex with antimony trichloride. The invention also contemplates as a part of the sequence of operations the steps of removing a portion or all of the antimony trichloride from the resulting mixture after the separation of the aforementioned complex, cooling the thereby resulting solution, crystallizing therefrom a different component substantially as a pure component alone or in the form of a solid phase complex with antimony trichloride.

Described somewhat more specifically, the invention is a process of separating as substantially pure substances, components from a liquid mixture thereof, which comprises admixing antimony trichloride to said mixture containing at least two difficultly separable organic compounds each of which is capable of forming a solid phase complex with antimony trichloride and adjusting the temperature of the resulting mixture to solidify one of the components substantially as a pure compound in the form of a solid phase complex with antimony trichloride, thereby causing a corresponding change in the composition of said liquid mixture as a result of the separation of the solid phase complex, further cooling said mixture so as to cause the composition of the liquid phase mixture to change to a point just short of its eutectic composition, thereupon after the separation of said solid phase complex, removing a quantity of antimony trichloride from the resulting mother liquor so as to change its composition to such an extent that when the mother liquor is cooled again another component separates out as a substantially pure organic compound in the form of a solid phase complex with antimony trichloride, before the eutectic line is reached again due to the constantly changing mother liquor composition as the solid phase complex separates.

Having described the invention in its broader aspect or scope, it will now be described in greater detail, both as applied broadly and as applied to a more specific embodiment thereof, the description being made with reference to the accompanying drawings which are made a part of the specification and wherein:

Figure I represents a part of the solid-liquid phase relationships of the system, antimony trichloride, para-xylene and meta-xylene.

Figure II is a liquid-solid, three-component, phase diagram on a mol-per cent basis of the system, antimony trichloride, meta-xylene and para-xylene including eutectic lines and lines representing a combination of steps in an application of the invention to the separation of meta-xylene and para-xylene from a mixture thereof;

Figure III is a liquid-solid, 3-component, phase diagram on a mol-percent basis of the system, antimony trichloride, mesitylene and pseudo-cumene showing eutectic composition thereof;

Figure IV is a liquid-solid, 3-component, phase diagram on a mol-percent basis of the system, antimony trichloride, para-xylene and ethylbenzene showing eutectic compositions thereof;

Figure V is a liquid-solid, 3-component, phase diagram on a mol-percent basis of the system, antimony trichloride, meta-xylene and ethylbenzene including eutectic compositions thereof; and Figure VI is a process flow diagram of an embodiment of the invention as applied to the separation and recovery of para-xylene and meta-xylene from a mixture thereof.

Antimony trichloride is known to form 2-component complexes with various individual aromatic hydrocarbons, as for example, ortho-, meta- and para-xylenes and their corresponding 2-component, solid-liquid phase diagrams with antimony trichloride may readily be produced from data to be found in the literature. However, heretofore the phase relationships for corresponding ternary systems including antimony trichloride have not been known.

Referring to Figure I, the curves show that the ratio of meta-xylene to para-xylene, in the various 3-component solid phases which are obtainable from various mixtures of the three components, depends upon the proportions of antimony trichloride present in the liquid phase, as indicated by a displacement of the minima in the solid-line curves to smaller para-xylene proportions as the proportion of antimony trichloride is decreased. These relationships and application thereof will be better understood from the following considerations. For instance, when a 50:50 mol mixture of meta- and para-xylenes, represented by the vertical line at abscissa 50 (Figure I) is mixed at 70° C., with sufficient SbCl₃ to give a mixture which contains 66 mol percent SbCl₃, the mixture may be represented by point A, and will be a single liquid phase. Upon cooling said mixture a solid phase begins to separate at about 54° C., the solid phase having a composition represented by (SbCl₃)₂·p-C₆H₄(CH₃)₂, which has the melting point of about 70° C. If antimony trichloride is added to the liquid phase to maintain its concentration at the indicated 66 mol percent value, further cooling and separation of solid phase results in change in the composition of the mother liquor as indicated by moving to the left along the 66% line until the minimum point (eutectic) is reached. Similar considerations apply to other proportions of antimony trichloride in accordance with the solid-line curves. Since, in practice, the antimony trichloride-xylene complex may be separated as solid phase, without the addition of antimony trichloride to maintain its concentration constant, the composition may actually change gradually as if the system were moving along a line passing through the minima of the various curves. Similar changes occur for systems representable by points on Figure I to the left of the minima of the solid-line curves, except that in those cases the solid phase which separates is composed of antimony trichloride and meta-xylene. Consider the system represented by point B, with, say 45% antimony trichloride. Upon cooling the mixture sufficiently, the solid complex,

$$(SbCl_3)_2 \cdot p\text{-}C_6H_4(CH_3)_2$$

will separate and the mother liquor may eventually reach the state as represented by point C on the 31 mol percent solid-line curve. Now, removal of the xylenes from the antimony trichloride in the mother liquor, as by distillation, adjusting of the temperature of the separated xylenes mixture to, say −15° C., and incorporation therewith of 18 mol percent antimony trichloride, will yield a system represented by point D. Upon cooling this mixture under meta-stable conditions to about −20° C., a solid-phase compound of the complex, SbCl₃·m-C₆H₄(CH₃)₂, separates out; further cooling causes further separation of the same complex and the composition of the motor liquor changes as indicated by the dashed line curve. The dashed-line curves represent the meta-stable equilibrium conditions of solid and liquid phases when the solid phase has the composition SbCl₃·p-C₆H₄(CH₃)₂ or $$SbCl_3 \cdot m\text{-}C_6H_4(CH_3)_2$$

as the case may be. Thus, it is seen that meta-xylene may be separated in the solid phase under selected conditions even when it is present in the liquid phase in a concentration less than about 88%, based on combined meta- and para-xylenes, which is the simple 2-component eutectic composition.

Referring now to Figure II, which is a liquid-solid phase diagram of meta-xylene and para-xylene when admixed with various amounts of antimony trichloride, it will be observed that there are seven regions characterized by the solid compositions which co-exist with liquid. In the region S the solid is antimony trichloride, in the region S₂–P the solid is the para-xylene:antimony trichloride complex which contains two mols of antimony trichloride to one mol of para-xylene,

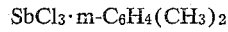

$$(SbCl_3)_2 \cdot p\text{-}C_6H_4(CH_3)_2$$

in the region S–P the solid is another para-xylene:antimony trichloride complex but one which contains one mol of antimony trichloride to one mol of para-xylene, SbCl₃·p-C₆H₄(CH₃)₂; in the region S₂–M the solid is the meta-xylene:antimony trichloride complex which contains two moles of antimony trichloride to one mol of meta-xylene (SbCl₃)₂·m-C₆H₄(CH₃)₂; in the region S–M the solid is another meta-xylene:antimony trichloride complex but one which contains one mol of antimony trichloride to one mol of meta-xylene,

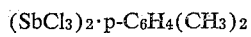

$$SbCl_3 \cdot m\text{-}C_6H_4(CH_3)_2$$

in the region P, the solid is para-xylene; and in the region M, the solid is meta-xylene.

In the stable region as indicated by the solid lines not a great eutectic composition displacement occurs. However, in the meta-stable region as indicated by the dashed-lines a significant change occurs in the ratio of meta-xylene to para-xylene in the eutectic compositions derivable therefrom. The most easily attained meta-stable condition is apparently that in which the complex S–P ($SbCl_3 \cdot p\text{-}C_6H_4(CH_3)_2$) does not form. When this is obtained each of the regions $S_2$–P, P and S–M probably expand so as to form the system described by the meta-stable eutectic lines (dashed lines).

The significance of the relationships which exist as represented by dashed line GK (point K corresponds to about 50% para-xylene on the total meta-, para-xylene basis) and how these relationships are utilized in the present invention may be clarified further by an examination of the actual situation as represented by line GK and the hypothetical line LO drawn from the simple para-xylene:meta-xylene eutectic point to the point of pure antimony trichloride. The point L corresponds to about 88% meta-xylene and 12% para-xylene or a ratio of about 7:1 of meta- to para-xylene. The ratio of meta-xylene to para-xylene is the same value (about 7:1) at every point on the line LO. In other words, if the antimony trichloride functioned solely as an inert diluent when admixed with a mixture of meta- and para-xylenes, the eutectic compositions obtainable therefrom would all have the same ratios of meta-to-para-xylene. Contrary thereto, the intersection of lines GF (points G and F correspond to about 20% and 10% by weight para-xylene respectively on a xylene basis) and LO at W shows that there is only one antimony trichloride concentration at which the net result is equivalent to what it would be if the antimony trichloride were an inert diluent, and that there is no equivalent antimony trichloride concentration when operating under meta-stable eutectic conditions since the lines GK and LO do not intersect. At higher concentrations of antimony trichloride the ratio of meta-to-para-xylene in the eutectic composition (both in solid state as well as in the remaining liquid phase) is greater than the 7 to 1 ratio of the normal eutectic, while at lower concentrations the proportions of para-xylene in the eutectic composition (based on total meta- and para-xylenes) increases and reaches a value of about 50% at K.

The relationship of Figure II will be better understood from a description of an application of the invention as set forth with reference to Figure II. Upon the phase diagram have been drawn three lines representing three steps in a practice of the invention. Assuming that the meta-stable condition has been obtained, the first step represented by line A, is that of crystallizing and separating the $S_2$–P complex $(SbCl_3)_2 \cdot p\text{-}C_6H_4(CH_3)_2$; the second step, represented by line B, is that of reducing the antimony trichloride concentration; the third step, represented by line C is that of crystallizing and separating the S–M complex, $SbCl_3 \cdot$ meta-xylene. Thus, when a mixture of such composition represented by point Q is cooled, not only does a change in temperature of the system take place but also, due to this lowering of the temperature, solidification and separation of the solid phase complex, $S_2$–P, occurs. As a result of the separation of this solid phase complex the composition of the solution progressively changes, diminishing in the proportions of antimony trichloride and para-xylene contained therein. These changes in composition and lowering of temperature take place until the mixture reaches a composition represented by point R. Point R is located near or on the meta-stable eutectic line, the chilling operation preferably being controlled and stopped somewhat short if it is desired to insure high purity of the solid phase complex without risking contamination thereof with meta-xylene, which would occur if the cooling was continued for such a time as to cause the composition to lie on the indicated meta-stable eutectic line. The eutectic lines represent those compositions of mixtures from which it is not possible to separate out a solid phase containing antimony trichloride as a complex with only one of the organic components therein by a decrease in temperature. From the above illustration and explanation it is obvious that the separation of one of the components of a mixture, as a solid phase complex with antimony trichloride, is possible, provided of course that the composition of the solution does not correspond to any point on the eutectic lines of the system under the conditions of forming said complex.

Thus, by the method outlined above it is possible to separate para-xylene and meta-xylene from a mixture containing the same. Methods of recovering the organic compound (xylene) from its corresponding solid phase complex with antimony trichloride are readily available and will be suggested to those skilled in the art. For example, xylenes may be readily separated from antimony trichloride by distillation. Therefore, it can be seen that by the above described method, it is possible to separate a component of a mixture by the simple operations of cooling, separating the solid phase complex, melting and distillation.

Referring again to Figure II, and still assuming meta-stable conditions are obtained a mixture of antimony trichloride: meta-xylene:para-xylene, of a composition represented by point Q on the diagram, upon being cooled yields a solid phase complex of para-xylene with antimony trichloride ($S_2$–P). Because of the solidification and separating out of this solid phase complex, the composition of the solution will reach some point R, located along a line drawn between point Q and the point representing the antimony trichloride-para-xylene complex and toward the direction of diminishing para-xylene content. After the removal of said solid phase complex the remaining liquid mixture of a composition represented by point R, is transferred to an appropriate receiver and antimony trichloride removed therefrom. The removal of antimony trichloride may be accomplished by various methods, as for example by distillation. As a result of the removal of antimony trichloride the composition of the solution will change to a composition such as is represented by point T.

It should be noted that the composition of the solution resulting after the removal of antimony chloride will be somewhere along a line drawn through point R and that point (O) of the three phase diagram which represents 100% antimony trichloride. Since antimony trichloride is being removed the new, resulting composition will be represented by a point on this line in the direction of diminishing antimony trichloride content.

After the composition of the solution has been changed, by the removal of antimony trichloride, so as to reach some composition represented by point T, it should be noted that the solution represented by such a point T can have in equilibrium with it a solid phase complex composed of one mol of antimony trichloride to one mol of meta-xylene. Again when a mixture of such composition T is cooled, not only does a change in temperature of the system take place but also, due to this lowering of the temperature, solidification and separating out of the solid phase meta-xylene complex with antimony trichloride takes place. As a result of the separation of this solid phase complex the composition of the solution progressively changes, diminishing in the amounts of antimony trichloride and meta-xylene. Because of the cooling, the aforementioned change in composition takes place until a composition represented by point U is reached. Point U is located close to the indicated meta-stable eutectic line, the cooling operation being controlled and stopped somewhat short thereof so as to insure high purity of the solid phase meta-xylene complex without risking contamination thereof with para-xylene which would occur if the cooling was continued for such a time as to change the composition of the solution corresponding to a point on the eutectic line.

From the above (i. e., cooling the solution from composition T to composition U) it is obvious that it is possible to separate meta-xylene as a solid phase complex with antimony trichloride when starting with any composition, such as is represented by point T, lying within the S–M region.

It should be noted that the mother liquor of composition U remaining after the separation of the solid phase complex of meta-xylene with antimony chloride, may be returned to the process at any suitable point depending upon the operating conditions. Likewise, antimony trichloride, recovered from the separation of the organic compounds from the solid phase complexes and/or from the operation wherein antimony trichloride is removed from the solution (i. e. going from point R to T) may be returned to the process at any suitable point depending upon the operating conditions. The method and manner of recycling the above materials to the best advantage will be understood by those skilled in the art.

Referring now to Fig. III, there are seven regions in the diagram characterized by the solid phase which can coexist with a liquid phase. In region S the solid is antimony trichloride, in region $S_2$–P the solid is the antimony trichloride:pseudo-cumene complex which contains two mols of antimony trichloride to one mol of pseudo-cumene; in the region S–P the solid is the antimony trichloride:pseudo-cumene complex which contains one mol of antimony trichloride to one mol of pseudo-cumene; in the region $S_2$–M the solid is the antimony trichloride: mesitylene complex which contains two mols of antimony trichloride to one mol of mesitylene; in the region S–M the solid is the antimony trichloride:mesitylene complex which contains one mol of antimony trichloride to one mol of mesitylene; in the region P the solid is pseudo-cumene; in the region M the solid is mesitylene. Similarly with reference to Figure IV there are seven regions in the diagram characterized by the solid phase which can coexist with a liquid phase. In the regions S, $S_2$–P, S–P, $S_2$–E, S–E, P and E, the solid phases are respectively; antimony trichloride; the antimony trichloride: paraxylene complex which contains two mols of antimony trichloride to one mol of para-xylene; the antimony trichloride:para-xylene complex which contains one mol of antimony trichloride to one mol of para-xylene; the antimony trichloride:ethylbenzene complex which contains two mols of antimony trichloride to one mol of ethylbenzene; the antimony trichloride:ethylbenzene complex which contains one mol of antimony trichloride to one mol of ethylbenzene; para-xylene; and ethylbenzene. Likewise, referring now to Figure V, there are seven regions in the diagram characterized by the solid phase which can coexist with a liquid phase. In the regions S, $S_2$–M, S–M, $S_2$–E, S–E, M and E, the solid phases are respectively antimony trichloride; the antimony trichloride:meta-xylene complex containing two mols of antimony trichloride to one mol of meta-xylene; the antimony trichloride: meta-xylene complex containing one mol of meta-xylene; the antimony trichloride:ethylbenzene complex containing two mols of antimony trichloride to one mol of ethylbenzene; the antimony trichloride:ethylbenzene complex containing one mol of antimony trichloride to one mol of ethylbenzene; meta-xylene; and ethylbenzene.

Accordingly, by performing the operations of cooling to separate out a solid phase complex, removing antimony trichloride from the resulting mother-liquor and cooling again to separate out a different solid phase complex in the manner described hereinbefore with reference to Figure II, it is possible to separate and recover substantially pure mesitylene and/or pseudo-cumene from mixtures of the same also substantially pure para-xylene and/or ethylbenzene from mixtures of the same and substantially pure meta-xylene and/or ethylbenzene from mixtures of the same.

A particular embodiment of the invention will be described with reference to Figure VI. Figure VI is a process flow sheet showing the application of the invention to the separation of meta-xylene and/or para-xylene from mixtures thereof. For the sake of simplicity and in order that the process may be more readily understood, various storage tanks, pumps, instruments, heat exchangers, service accessories, etc. have been omitted from the drawing since the proper use of these devices will be readily understood by one skilled in the art. It will be understood that the incorporation of any numerical values into the description of the operations is made solely for the purpose of illustration and clarification and that various modifications may be readily made.

The indicated feed stock of xylenes utilized in accordance with the process indicated in Figure VI has the following approximate composition, is composed substantially entirely of para- and meta-xylenes in the mol ratio (same as weight ratio): para-xylene 23 to meta-xylene 77, that is, of the order of about 20–25% para-xylene and about 75–80% meta-xylene. To a mixture of xylenes of this composition is added an amount of antimony trichloride sufficient to cause the composition of the mixture to correspond to a point of composition Q as shown in Figure II. This mixture containing the above components in the aforementioned amounts is then introduced by means of line 10 into a suitable dryer 11. The resultant dried mixture is then chilled under meta-stable conditions in cooler 12, to a suitable temperature with the resultant formation of a precipitate, consisting of the solid phase complex of antimony trichloride and para-xylene, said complex containing two mols of antimony trichloride per mol of para-xylene. The resultant slurry from cooler 12 is transferred by means of line 13 to centrifuge 14 wherein the solid and liquid phases are separated. The separated solid complex is withdrawn from the centrifuge and transferred to a stripper 17 by mechanical transfer means 15; stripper 17 is heated by indirect heating means 16 employing any suitable heating medium such as superheated steam. The solid complex is melted at the appropriate temperature, substantially pure para-xylene, free of meta-xylene, is recovered as distillate from the top of stripper 17 and collected as para-xylene product. The bottoms in the stripper 17 is essentially antimony trichloride, and is withdrawn through line 19.

The mother liquor remaining after the separation of the para-xylene solid phase complex in centrifuge 14 is transferred by conduit means 35 to a stripper 21 which is provided with indirect heating means 20, employing a suitable heating medium, such as superheated steam. Therein, the mother liquor is separated into its constituents, namely a distillate mixture of para-xylene and meta-xylene removed from the top of the stripper and a residue consisting essentially of antimony trichloride taken from the bottom. The para- and meta-xylenes are collected from the stripper by transfer means 22, to which therein is added, by line 24, antimony trichloride, such as a portion of that withdrawn from stripper 21 by line 24. The resulting mixture of para- and meta-xylenes and antimony trichloride in line 22 is chilled under meta-stable conditions as for example by seeding with crystals of the $(SbCl_3)_2$·meta-xylene complex, in cooler 23 to a suitable temperature to yield a precipitate consisting of a solid phase complex of antimony trichloride and meta-xylene, said complex containing one mol of antimony trichloride per mol of meta-xylene. The resultant slurry of solid and liquid from cooler 23 is transferred by line 26 to a centrifuge 27 wherein the solid and liquid phases are separated by centrifugation. The separated solid complex is withdrawn from the centrifuge and transferred to stripper 30 by transfer means 28; stripper 30 is heated by heating coil 29 employing any suitable heating medium such as steam. At the appropriate temperature pure meta-xylene, free of para-xylene, is removed as distillate from the top of the stripper 30 and is collected as meta-xylene product. The stripper bottoms product consisting essentially of antimony trichloride is withdrawn by line 32.

The mother liquor separated from the meta-xylene solid phase complex in centrifuge 27 is transferred by conduit 34 as recycle material to be used with the fresh feed mixture of para- and meta-xylenes, since the proportion of xylenes therein is substantially the same as in the initial feed mixture. Likewise, the antimony trichloride bottoms of strippers 17, 21 and 30 may be removed by means 19, 25 and 32, respectively, and transferred by means 33 as recycle material to be used with fresh feed containing a mixture of para- and meta-xylenes.

Instead of recycling the mother liquor after separation of the meta-xylene solid phase complex in line 34 back to be mixed with fresh xylene feed stock, if desired, antimony trichloride may be added thereto to change the composition thereof to that corresponding to some point along line D (see Figure II), such as point $Q_1$, after which it may be subjected to the previously described sequence of operational steps.

Alternatively, referring again to Figure II, antimony trichloride may be added to change the composition to a value still in the S–M region such as represented by point $R_1$ after which a further amount of the solid phase complex S–M is produced by cooling until the mother liquor has the composition of point $U_1$, and which can be processed by adding $SbCl_3$ thereto to give a composition such as represented by $Q_2$ and subjecting the mixture to a sequence of operations as previously described.

In the foregoing described process, the chilling operations were carried out so that the compositions of the solutions would approach those of the eutectic lines, but they were stopped somewhat short thereof so as to insure high purities of the solid phases and to avoid contaminations thereof with other xylene components. It is to be understood, of course, that in any operation of partial crystallization, centrifugation, etc., the separated solid phase may be subjected to suitable washing operations with selected washing media to remove adherent materials which may be considered as impurities to the solid phase.

In view of the foregoing description, it is to be seen that, with a slight sacrifice in purity, in general the cooling and fractional solidification of the solid phase which contains only one of the xylene isomers may be continued until a eutectic composition is reached, that is a condition is reached at which it is no longer possible to separate out only one organic component as a solid phase complex with antimony trichloride, after which the antimony trichloride content of the separated mother liquor is changed substantially, as by adding or removing antimony trichloride to shift the composition to a value such that upon cooling a complex of antimony trichloride and only one of the organic components (xylene isomers) preferably a different organic component (another xylene isomer) separates as a solid phase complex. Thereafter, such second solid phase complex is caused to separate by cooling the mixture until a eutectic composition is again reached. If desired such operations may be repeated by a number of times in various sequential orders. Also it may be found to be desirable in some instances to combine with one or more crystallization steps as described hereinbefore, a step of fractional crystallization of one of the organic components (xylenes) from the mixture of organic components to be separated, such as para-xylene from a mixture of para- and meta-xylenes, in the absence of antimony trichloride, although in general this has the disadvantage of requiring lower temperatures.

From the foregoing explanation and description it is seen that it is possible to separate para-xylene and/or meta-xylene from mixtures containing the same by selective crystallization of a solid phase complex with antimony trichloride. Likewise, with reference to Figures III, IV, and V, respectively, it is also possible by applying the same methods, to separate mesitylene and/or pseudo-cumene from mixtures of the same, para-xylene and/or ethylbenzene from mixtures of the same and meta-xylene and/or ethylbenzene from mixtures of the same. Furthermore from a study of Figures II, IV and V a good approximation of the quaternary phase diagram of antimony trichloride, ethylbenzene and meta- and para-xylenes may be had and which will show that it is also possible to separate meta-xylene, para-xylene and ethylbenzene from mixtures containing these three components by selective crystallization with antimony trichloride.

It should be noted that the application of the invention is not restricted to the separation of disubstituted aromatic hydrocarbons or to the separation of $C_8$ isomeric aromatic hydrocarbons, but is applicable to the separation of trisubstituted aromatic hydrocarbons and the $C_9$ isomeric aromatic hydrocarbons such as mesitylene and pseudo-cumene, see Figure III.

As an added feature of this invention, it has also been found that the crystallization adjunct may be employed not only as antimony trichloride itself but also as an aqueous antimony trichloride solution. For example, a solution composed of 90% $SbCl_3$, 9% $H_2O$ and 1% $NaCl$, (all percents by weight) may be effectively employed to form antimony trichloride complexes with the various aromatic hydrocarbons to be separated. Likewise, antimony trichloride mixtures with acetic acid are also effective, particularly those which contain a major proportion of antimony trichloride.

It should be noted that in the processes described herein there may be admixed with the components to be separated minor amounts, say up to about 40% by weight, of ortho-xylene along with any other of the various organic compounds normally associated with the compounds to be separated, particularly the xylenes. In addition, there may be added to the components to be separated minor amounts of corrosion inhibitors and stabilizers for antimony trichloride.

It has also been found that liquid paraffin hydrocarbons even in major amounts may be added to the aromatic hydrocarbon mixture to be separated by complex formation with antimony trichloride. In effect the paraffin hydrocarbons act as diluents and have little effect upon the relative concentration of the various aromatic hydrocarbons at which the eutectics occur, particularly so upon mixtures of the various xylenes and their isomers. In general, the paraffin hydrocarbons affect only the temperature of the eutectic in the system and that not greatly because the lowering of the solubility of the complexes caused by the paraffins tends to compensate for the dilution brought about by their presence. Thus, for example, the incorporation of light paraffin hydrocarbons such as isopentanes slightly raises the temperatures at which the solid phases are formed. This reduces the refrigerating requirements of the process.

In general the processes outlined above are especially applicable for the separation of mixtures of isomeric aromatic hydrocarbons, particularly the isomeric alkyl benzenes such as the various xylenes and mesitylene and pseudo-cumene hydrocarbons as well as mixtures of isomeric alkyl derivatives of other ring compounds having conjugated unsaturation, such as the alkyl pyridines (lutidines, picolines, etc.), alkyl thiophenes and alkyl pyrroles. The invention is particularly adapted to the separation of 2,4- and 2,5-lutidines and $\beta$- and $\gamma$-picolines.

We claim as our invention:

1. A process for preparing essentially pure para-xylene from a mixture consisting essentially of 20–50 parts by weight of para-xylene and 80–50 parts by weight of meta-xylene which comprises forming a liquid solution by mixing said mixture at an elevated temperature with a substantial proportion of antimony trichloride to produce a resulting mixture from which a solid phase complex containing only antimony trichloride and para-xylene is first produced on cooling, cooling the resulting mixture until a eutectic liquid phase and a solid complex of para-xylene with antimony trichloride is formed, separating the solid complex from the eutectic liquid and recovering pure para-xylene from the separated complex.

2. A process for preparing essentially pure para-xylene from a mixture of $C_8$ aromatic hydrocarbons containing at least 20% para-xylene and at least 50% meta-xylene which comprises forming a liquid solution by mixing said mixture at an elevated temperature with a substantial proportion of antimony trichloride to produce a resulting mixture from which a solid phase complex containing only antimony trichloride and para-xylene is first produced on cooling, cooling the resulting mixture until an essentially eutectic liquid phase and a solid complex of para-xylene with antimony trichloride is formed, separating the solid complex from the liquid phase and recovering pure para-xylene from the separated complex.

3. A process for preparing essentially pure para xylene from a mixture consisting essentially of 20–50 parts by weight of para xylene and 80–50 parts by weight of meta xylene which comprises forming a liquid solution by mixing said mixture with an agent consisting essentially of antimony trichloride at an elevated temperature in a ratio of at least 1 mole of antimony trichloride per mole of aromatic feed, cooling the resulting mixture until a eutectic liquid phase and a solid complex of para xylene with antimony trichloride is formed, separating the solid complex from the eutectic liquid and recovering pure para xylene from the separated complex.

4. The method of separating substantially pure para-xylene and substantially pure meta-xylene from a mixture consisting essentially of para-xylene and meta-xylene and containing from about 20% to about 50% para-xylene, which comprises: (1) forming a liquid admixture of said mixture with a substantial proportion of antimony trichloride to produce an admixture from which a solid phase complex (A) containing only antimony trichloride and only a first one of said xylenes is first produced on cooling; (2) cooling said admixture to produce a substantial proportion of only said solid complex (A); (3) separating said solid complex (A) from a resulting first mother liquor containing antimony trichloride and some of said xylenes and being enriched in the other one of said xylenes; (4) altering the proportion of antimony trichloride in said first mother liquor, decreasing it when said solid complex (A) is a complex of antimony trichloride and para-xylene and increasing it when said solid complex (A) is a complex of antimony trichloride and meta-xylene, to produce an admixture from which a solid phase complex (B) containing only antimony trichloride and only the other one of said xylenes is first produced on cooling; (5) cooling said admixture to produce a substantial proportion of only said solid complex (B); (6) separating said solid complex (B) from a second mother liquor; (7) recovering substantially pure para-xylene from one of said separated solid phase complexes (A) and (B) and substantially pure meta-xylene from the other one of the complexes (A) and (B); and (8) recycling the resulting recovered antimony trichloride for further utility in preceding operations of the process.

5. The method according to claim 4, wherein the proportion of antimony trichloride in step (1) produces an admixture from which the solid phase complex (A) which separates is a complex consisting of antimony trichloride and para-xylene.

6. The method according to claim 5, wherein the resulting first mother liquor separated in step (3) is altered in step (4) in the proportion of antimony trichloride thereof by distillation into a distillate mixture of para-xylene and meta-xylene and a residue consisting essentially of antimony trichloride and reblending said distillate mixture with only a portion of said antimony trichloride residue.

7. The method according to claim 4, wherein the proportion of antimony trichloride in step (1) produces an admixture from which the solid phase complex (A) which separates is a complex consisting of antimony trichloride and meta-xylene.

8. The method according to claim 7, wherein the resulting first mother liquor separated in step (3) is altered in step (4) in the proportion of antimony trichloride thereof by adding a further amount of antimony trichloride thereto.

References Cited in the file of this patent

UNITED STATES PATENTS

| | | |
|---|---|---|
| 2,407,820 | Durrum | Sept. 17, 1946 |
| 2,435,792 | McArdle et al. | Feb. 10, 1948 |
| 2,459,146 | Bowman | Jan. 18, 1949 |
| 2,459,191 | Slagle et al. | Jan. 18, 1949 |
| 2,470,116 | Swietoslawski et al. | May 17, 1949 |

OTHER REFERENCES

International Critical Tables, vol. 4, McGraw-Hill Book Co. (1928), pp. 192–193.